United States Patent [19]

Hunter

[11] 3,981,446
[45] Sept. 21, 1976

[54] WATER OPERATED CONTROL APPARATUS AND METHOD

[75] Inventor: Edwin J. Hunter, Rancho Santa Fe, Calif.

[73] Assignee: The Toro Company, San Marcus, Calif.

[22] Filed: Aug. 22, 1974

[21] Appl. No.: 499,485

[52] U.S. Cl. .................................... 239/1; 239/63; 47/38; 137/78
[51] Int. Cl.² ........................................ A01G 25/00
[58] Field of Search ............ 61/12, 13; 239/63, 64, 239/1; 137/78; 47/38, 38.1, 48.5

[56] References Cited
UNITED STATES PATENTS

| | | | |
|---|---|---|---|
| 2,743,552 | 5/1956 | Hunter | 47/38.1 X |
| 3,747,399 | 7/1973 | Treirat | 239/63 |
| 3,758,987 | 9/1973 | Crane | 47/38.1 |
| 3,856,205 | 12/1974 | Rohling | 239/63 |

Primary Examiner—Martin P. Schwadron
Assistant Examiner—Richard Gerard
Attorney, Agent, or Firm—Poms, Smith, Lande & Glenny

[57] ABSTRACT

A water operated control apparatus and method for operating a controlled device is associated with moisture sensing apparatus for sensing the level of moisture available at a location and operating the controlled device in response thereto. Moisture sensing means is disposed at the location and is adapted to selectively pass air therethrough when the level of moisture at the location falls to a predetermined level, or prevent the passage of air therethrough when the level of moisture rises to a predetermined level. A housing is operatively connected to the sensing means and to a supply of water. A diaphragm is disposed in the housing in a manner forming a chamber therein, the interior of the chamber being in fluid communication with air passing through the sensing means. In one embodiment of the apparatus, a drain line of relatively small internal diameter is also in communication with the chamber and drains water from said supply in a hanging column of water such that the weight of the column of water pulls a partial vacuum in the chamber under the diaphragm when air is not being passed therein by the sensing means, as when the moisture level is above the predetermined level. Air from the sensing means relieves the negative pressure generated by the hanging column of water when the moisture level falls below the predetermined level. In another embodiment of the apparatus, the weight of water in a drain line is used to produce a positive pressure over the diaphragm when air is not passed by the sensing means. Air passing out through the sensor when the moisture level falls below a predetermined level relieves the pressure on the diaphragm. Movement of the diaphragm in response to the changing air pressure in the chamber may be used to operate a valve controlling flow of water through the chamber, or electrical contacts or a mechanical connection associated with the diaphragm which may in turn be connected to a controlled device or devices.

The water operated control method includes the steps of connecting a moisture responsive air valve in air flow communication with a chamber, establishing a vertical column of water in a conduit in fluid flow communication with the chamber, placing the chamber in air pressure sensing relation with an air actuated device and operating the device in response to variations in air pressure acting upon the device when air is not passed by the air valve compared to when air is passed by the air valve.

17 Claims, 14 Drawing Figures

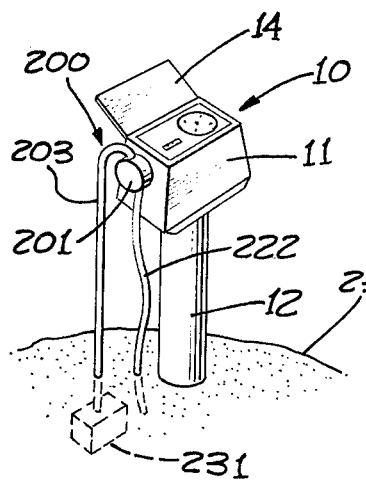
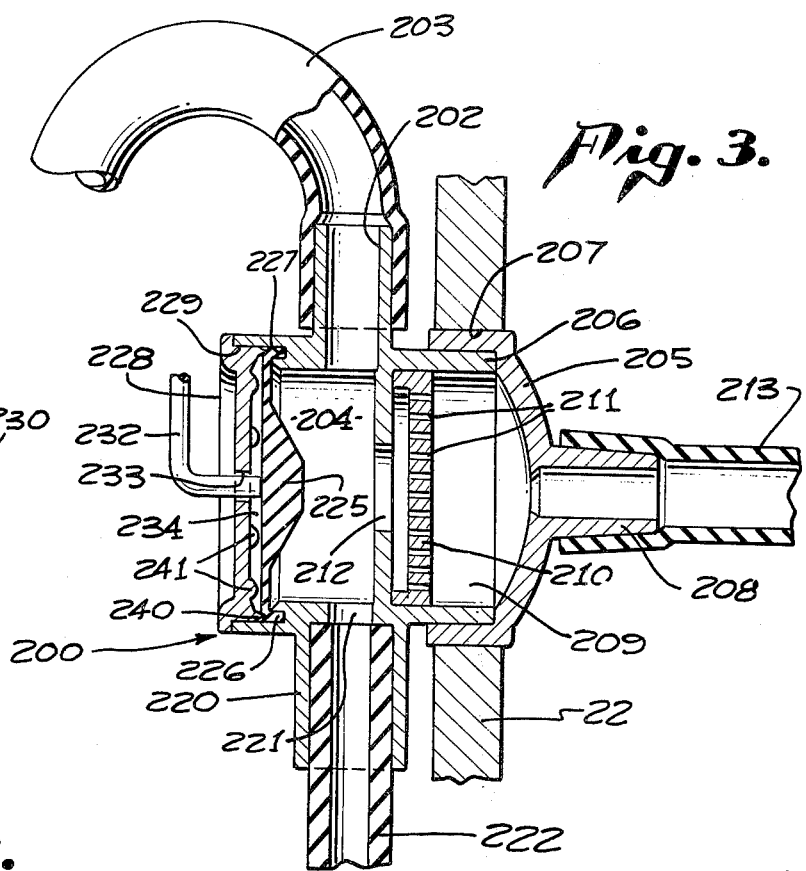
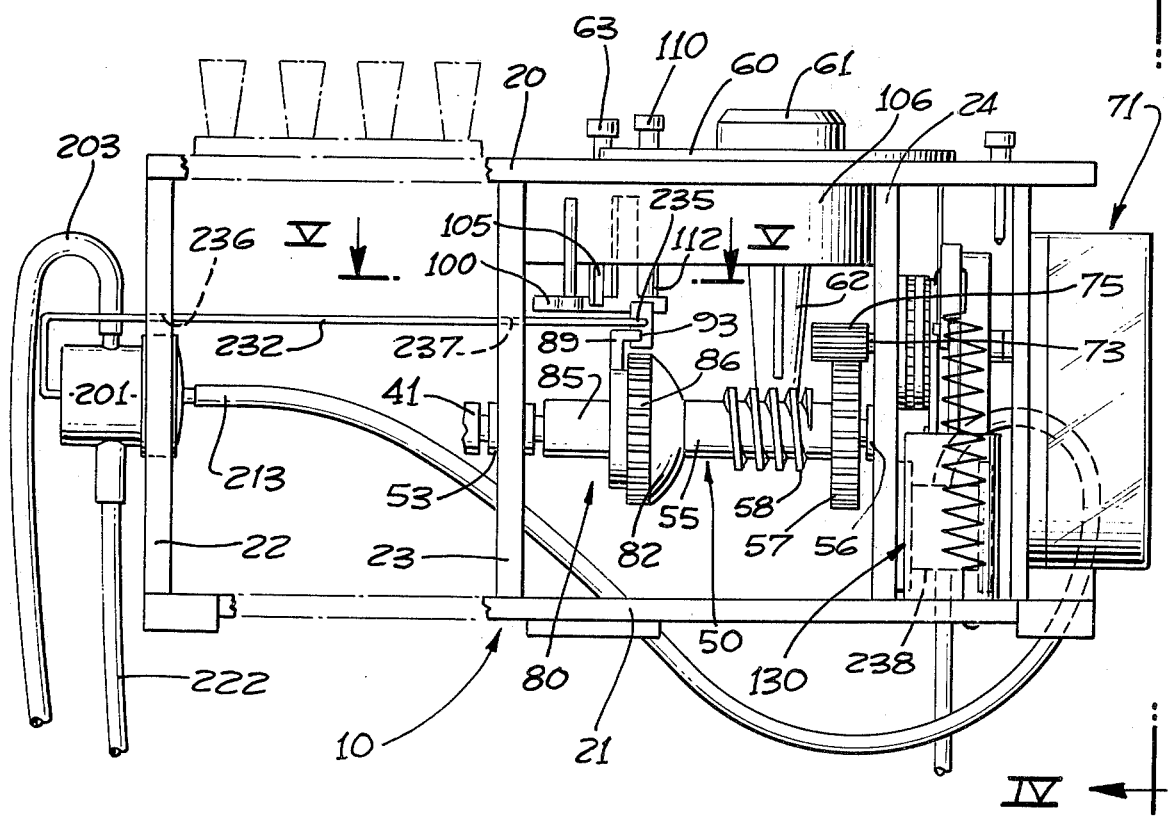

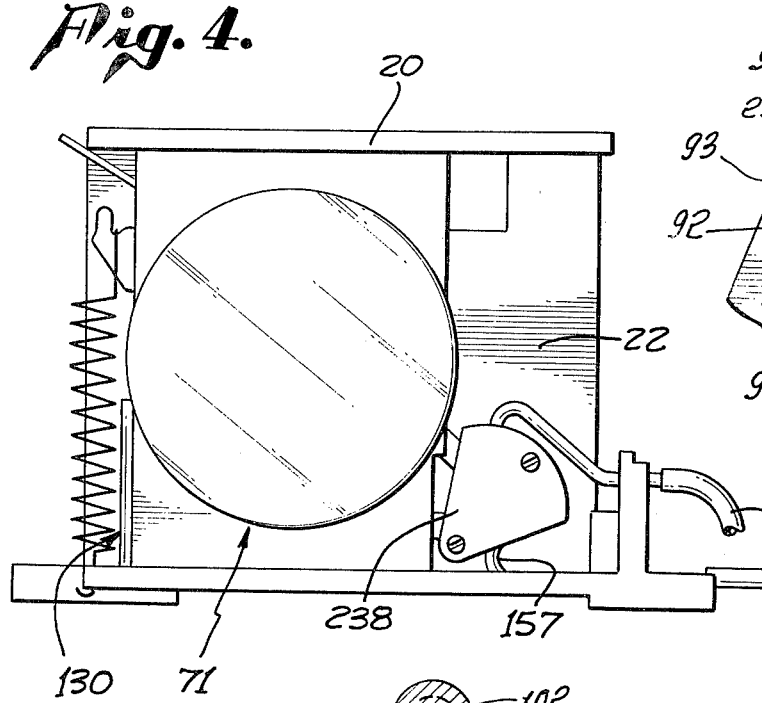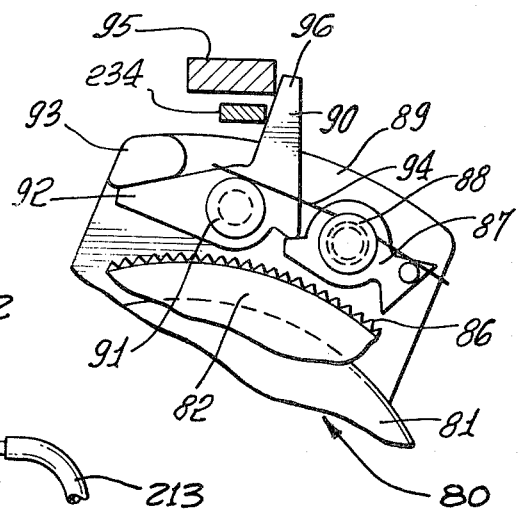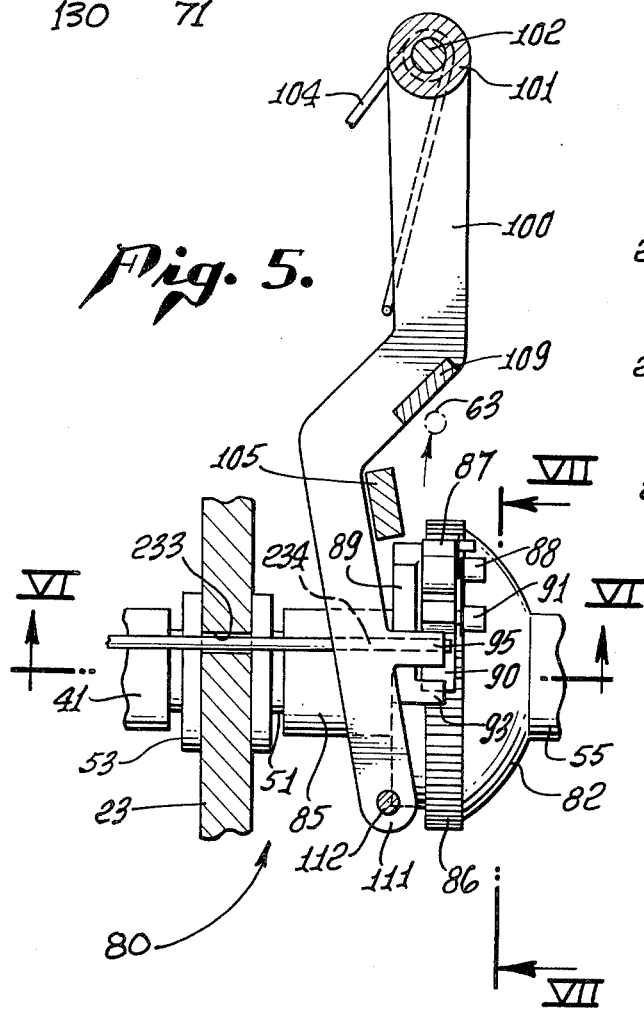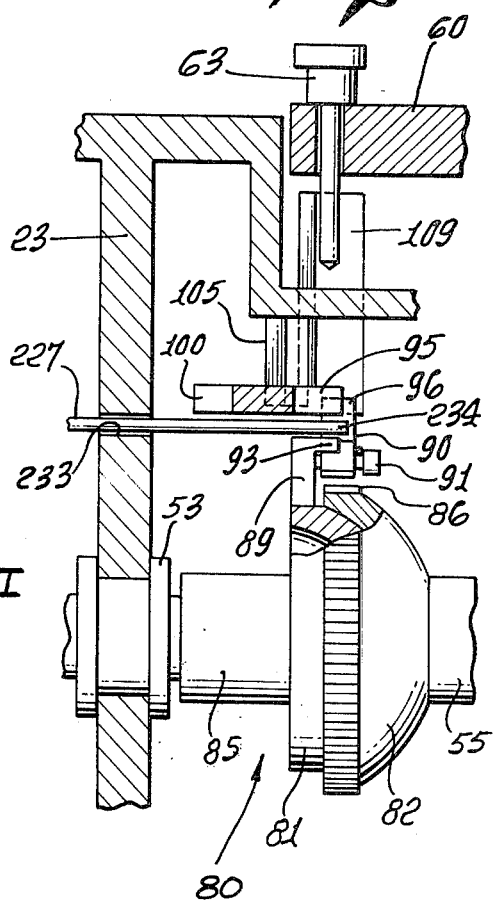

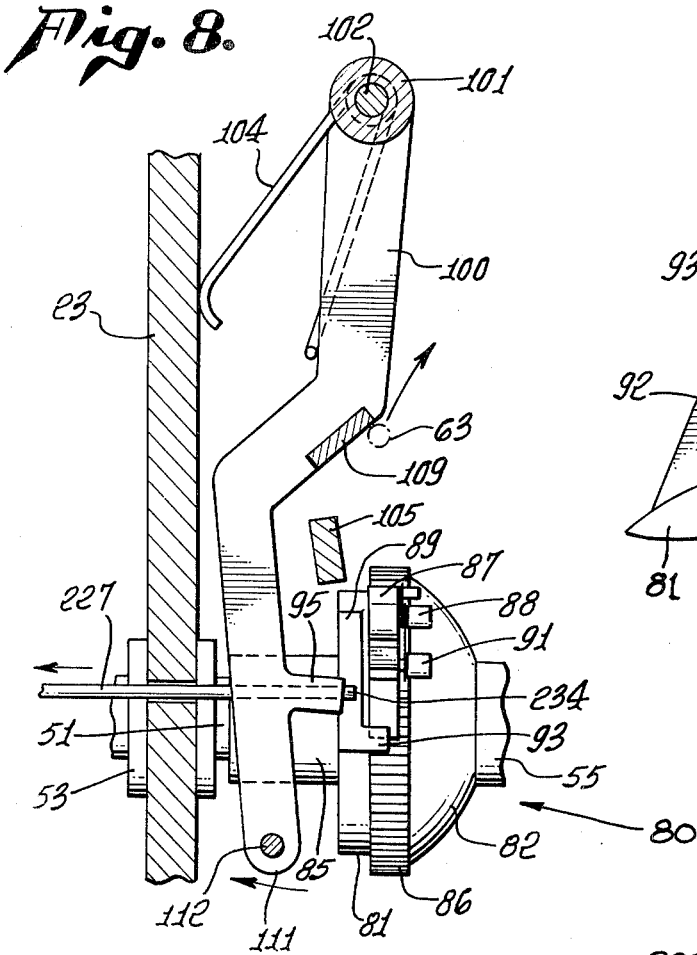
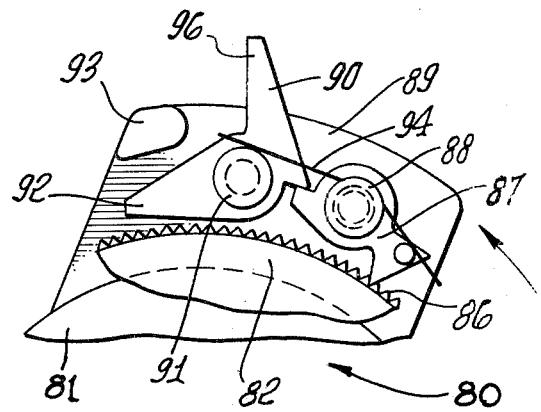
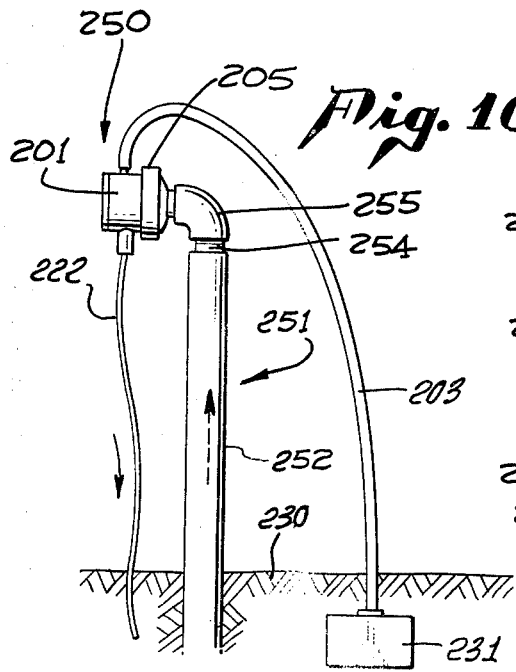
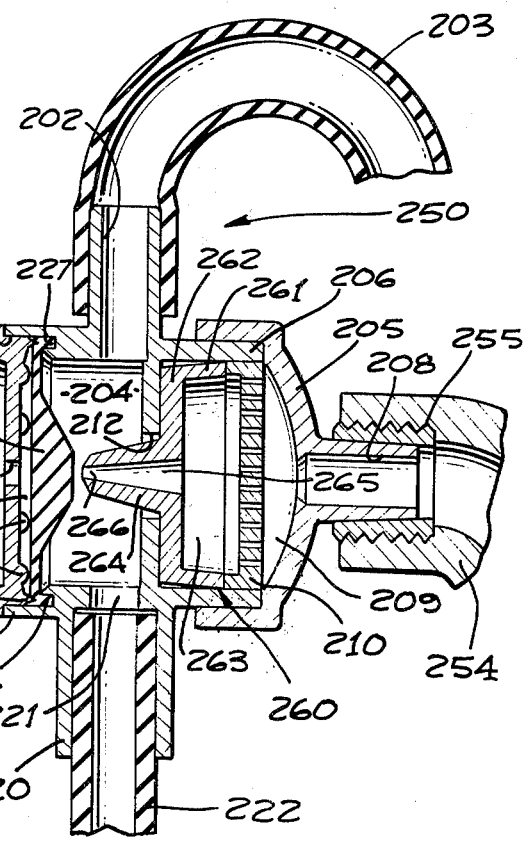

WATER OPERATED CONTROL APPARATUS AND METHOD

BACKGROUND OF THE INVENTION

1. Field of the Invention

The present invention relates in general to a water operated control apparatus and method for operating pneumatically responsive means, which may be associated with controlled devices, such as a pneumatically operated diaphragm means which may be associated with a water valve, electrical contacts or mechanical mechanisms, and which act in response to the level of moisture available at a given location and sensed by means of an associated moisture sensing apparatus.

2. Description of the Prior Art

Various types of irrigation control devices have been developed heretofore for irrigating lawns, golf courses, agricultural fields and even individual trees or plants which may be potted or planted. In general, the larger irrigation areas have been watered through sprinkler systems which are controlled by timer operated control devices. Individual plants or trees have been irrigated manually or by a timed and controlled stream or drip of water. Watering or irrigating by these and other prior methods have generally been in response to a predetermined timed sequence of watering operations which are not necessarily compatible with the actual need for water in the area being irrigated due to the change of climatic conditions independent of the mere passage of time.

There is a need in the art for apparatus and methods of irrigating both large and small planted areas, whether they be a farm field or a potted planting, wherein the amount of water supplied, and the timing of such supply, is correlated to the actual need for water in such location. In my prior application for U.S. Letters Patent Ser. No. 190,528 filed Oct. 19, 1971 and now U.S. Pat. No. 3,827,459 entitled "Water Powered Drive for Automatic Controllers" by way of example, I disclosed automatic irrigation control apparatus which is activated in a timed sequence of operation regardless of the actual moisture condition of the soil in the location of sprinklers controlled by the apparatus. I have recognized that it would be desirable to have some means for either starting, or not starting, the irrigation control apparatus of my prior application Ser. No. 190,528 in response to the presence or absence of a sufficient amount of moisture in the soil to be irrigated by the sprinkler system associated with the apparatus. I have also recognized that it would be desirable to provide such means in a relatively inexpensive manner and that it should preferably be water powered since a source of water is generally available to irrigation control apparatus, whereas electrical power may not.

It has also been known in the prior art that various devices can be used for determining the level of moisture in a given location in order to determine whether irrigation is required or not. One way would be to take core samples of the dirt in a location and testing each for its moisture content. However, it is also known that certain materials may pass air therethrough when dry but prevent the passage of air therethrough when saturated with water. Such moisture sensitive air valves, heretofore known in the art, comprise porous ceramic or plastic materials which have the ability to pass air or not, depending upon the amount of their water saturation. The measure of the ability of such materials or devices to pass air therethrough is generally referred to in the art as the "bubbling pressure", i.e., the pressure required for air to pass through the wetted material which is related to the pore size of the material.

SUMMARY OF THE INVENTION

In view of the foregoing, it is the primary object of the present invention to disclose and provide a water controlled apparatus and method for operating controlled devices, such as water valves, irrigation control apparatus as in my prior application Ser. No. 190,528 or other electrically or mechanically operated control devices in response to the changing amount of moisture present in the soil of a location associated in some manner with said controlled devices.

It is another object of the present invention to disclose and provide water operated control apparatus and method for supplying water to a location of need depending upon the moisture content of said soil as opposed to a mere timed irrigation system therefor.

It is another object of the present invention to disclose and provide water operated control apparatus as in the foregoing object wherein water is supplied by the apparatus or method in a steady drip thereof whenever soil conditions warrant the addition of such water.

It is a further object of the present invention to disclose and provide a water operated control apparatus and method for operating a controlled device where the operation of such device is preferably dependent upon the moisture conditions of soil in a particular location.

It is still a further object of the present invention to disclose and provide water operated control apparatus and method for use in conjunction with the automatic irrigation control apparatus of my prior application Ser. No. 190,528 to control the drive mechanism thereof.

These and other objects of the present invention are accomplished, according to the present invention, through the method of connecting a moisture responsive air valve, or moisture sensing means, for passing air, or not, therethrough dependent upon the moisture conditions of the environment thereof in air flow communication with a chamber, establishing a vertical column of water in a drain conduit in fluid communication with the chamber, placing an air actuated device in air pressure sensing relation with the chamber and operating such controlled pneumatic device in response to variations in air pressure in the chamber when air is not passed by the air valve compared to when air is passed by the moisture responsive air valve.

More specifically, the apparatus and method of the present invention includes the provision of moisture sensing means, which may comprise the heretofore known porous ceramic or plastic materials noted, and placing the same in soil at a location where soil moisture content is to be sensed. An air conduit is connected between the moisture sensing means and a chamber within a housing. The housing chamber is also connected to a supply of water. The supply of water may be the water discharge attendant operation of the irrigation control apparatus of my prior application Ser. No. 190,528, or it may be merely a source of water under pressure. A drain line is also placed in communication with the chamber and is provided with a relatively small internal diameter so that water draining from the chamber forms a continuous or interrupted column of water which, by its weight, in one embodiment is able to pull a partial vacuum in the chamber when air is not being introduced into the chamber by the associated sensing means or air valve. In a second embodiment, the weight of the water is used to apply a positive pressure to the chamber when air is not being vented from the chamber by the associated sensing means. Pneumatically operated means, including a diaphragm, is disposed in the housing in a manner such that the diaphragm moves from a normal rest position in response to changing pressure conditions within the chamber relative to ambient or atmospheric pressure outside the chamber. Movement of the diaphragm may be employed to open or close the water supply to the chamber or to operate associated electrical or mechanical means which in turn may be connected to other controlled devices.

In the first embodiment noted, and when the soil conditions surrounding the moisture sensing means are such that the moisture level falls below a predetermined amount, as determined by the bubbling pressure of the material employed in the moisture sensing means, air passes through the sensing means to or from the chamber and causes the diaphragm to return to its normal position. As will be explained more fully hereinafter, such movement of the diaphragm may be employed for controlling water flow to the housing itself, and thus through an associated drain line for purposes of irrigating an area or planting services by such drain line, or it may be employed for operating electrical or mechanical means associated therewith for operating other control devices such as the irrigation control apparatus of my prior application Ser. No. 190,528.

Reference will be made to the appended sheets of drawings, which will now be explained briefly before commencing the detailed description of preferred exemplary embodiments of the control apparatus and method of the present invention.

BRIEF DESCRIPTION OF THE DRAWINGS

FIG. 1 is a perspective view of the automatic irrigation control apparatus of my prior U.S. patent application Ser. No. 190,528 mounted on a pedestal and associated with a water operated control apparatus constructed, and which operates, in accordance with the present invention on a negative pressure;

FIG. 2 is a side view, partially in section, of the apparatus of FIG. 1;

FIG. 3 is a detail section view of the water operated control apparatus of FIG. 1;

FIG. 4 is an end view of the automatic irrigation control apparatus of FIG. 2 taken therein along the plane IV—IV;

FIG. 5 is a detail view of a portion of the automatic irrigation control apparatus of FIG. 2 taken therein along the plane V—V showing the control arm 234 of the within water operated control apparatus engaging pawl 90 and thereby deactivating the automatic irrigation control apparatus;

FIG. 6 is a section view of the apparatus of FIG. 5 taken therein along the plane VI—VI;

FIG. 7 is a section view of the apparatus of FIG. 5 taken therein along the plane VII—VII;

FIG. 8 is a detail view as in FIG. 5, but showing the control arm 234 disengaged from pawl 90 to allow operation of the irrigation control apparatus in its otherwise timed sequence;

FIG. 9 is a detail view as in FIG. 7, but showing the parts thereof in their relation to one another as in FIG. 8;

FIG. 10 is an elevational view of an alternative exemplary embodiment of the water operated control apparatus of FIGS. 1 through 9 in accordance with the present invention;

FIG. 11 is a vertical section view of the alternative exemplary embodiment of water operated control apparatus of FIG. 10;

DESCRIPTION OF THE PREFERRED EMBODIMENTS

Figure 12:
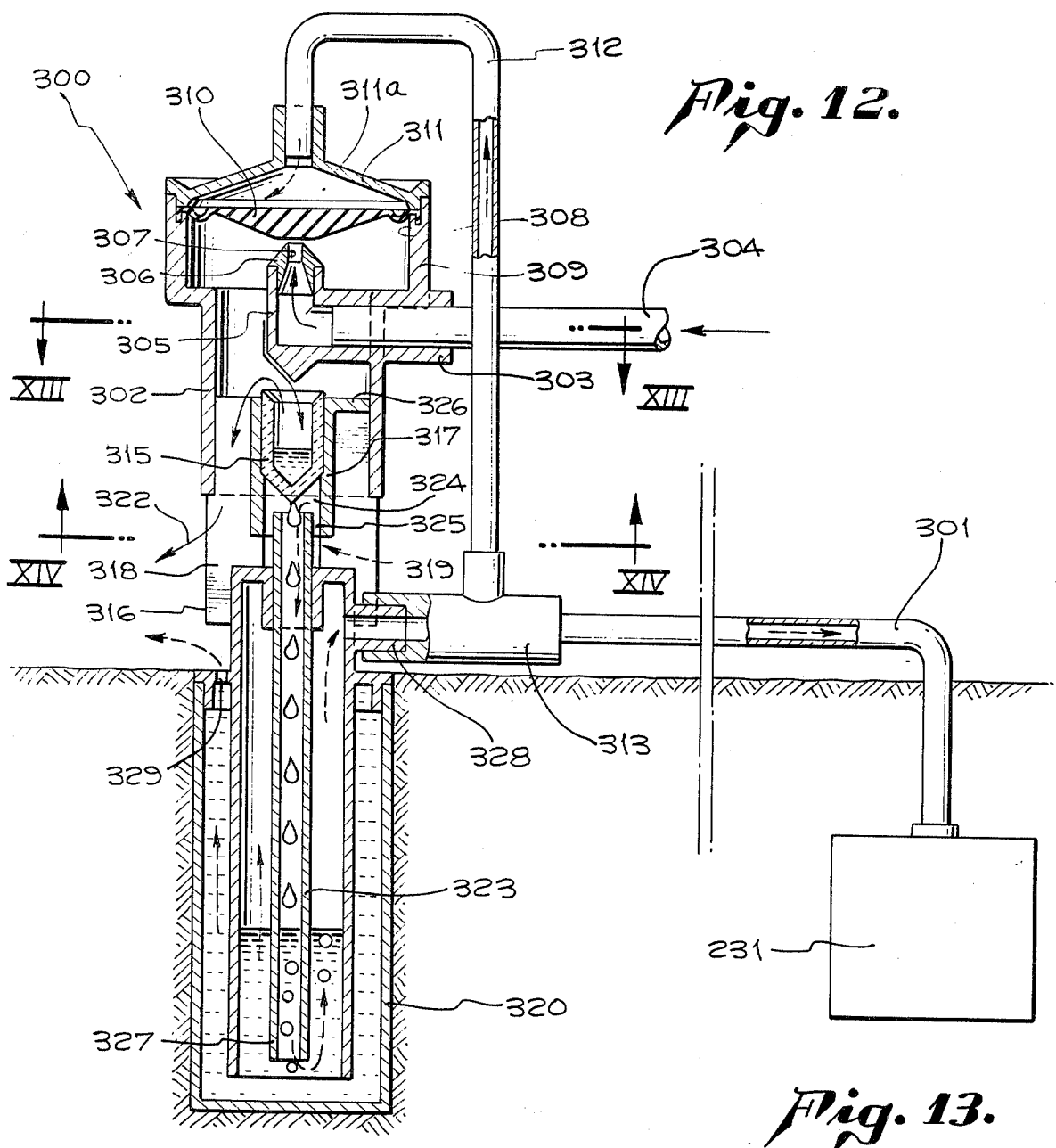
FIG. 12 is a vertical section view of another alternative exemplary embodiment of water operated control apparatus according to the present invention and which operates on a positive pressure.

Referring first to FIG. 1 of the drawings, a preferred exemplary embodiment of the water operated control apparatus in accordance with the present invention is indicated at 200 in association with an exemplary embodiment of controlled device, which for illustrative purposes is the irrigation control apparatus disclosed in my prior application Ser. No. 190,528. The irrigation control apparatus, indicated generally at 10, which in the present disclosure constitutes a controlled device operated by the water operated control apparatus and method of the present invention, is mounted in a housing 11 supported upon a pedestal 12 with a cover plate 14 for housing 11.

Before explaining the operation of the controlled irrigation control apparatus indicated generally at 10, it can be seen in FIGS. 1 and 2 that the exemplary embodiment of water operated control apparatus may be mounted to a side wall of the irrigation control apparatus with an air conduit 203 in communication with a moisture sensing means 231 located in the soil or ground 230 adjacent to pedestal 12. In addition, a drain line 222 is shown running from the water operated control apparatus 200 for draining water therefrom which, in the environment of the irrigation control apparatus arrangement of FIGS. 1 through 9, is supplied via water inlet line 213 (see FIG. 2) running from the water power drive for the irrigation control apparatus to the water operated control apparatus, indicated generally at 200.

Before explaining the operation of the preferred exemplary embodiment of water operated control apparatus, indicated generally at 200, a brief description will be given on the operation of the irrigation control apparatus of my prior application Ser. No. 190,528, the teachings of which are incorporated herein by reference.

THE IRRIGATION CONTROL APPARATUS

As described more fully in my prior patent application, the exemplary irrigation control apparatus, indicated generally at 10, is adapted to operate a plurality of pilot valves in predetermined timed sequence for selectively pressurizing associated pilot lines to operate pilot operated flow valves for selectively watering various parts of an irrigation system. Referring to FIG. 2, the control apparatus, indicated generally at 10, includes a face or mounting plate 20, a rear or back plate 21, and a plurality of interconnecting partition walls 22 through 24. The major portions of the partition walls 22 through 24 may be molded integrally with face plate 20 and be assembled to mating corresponding portions thereof formed integrally of back plate 21. Such assembly of front, back and partition walls comprises a frame for mounting various operating portions of irrigation control apparatus 10, the frame and operating portions being insertable into a housing such as housing 11 shown in FIG. 1.

In my prior automatic irrigation control apparatus of U.S. patent application Ser. No. 190,528, a bank of pilot valves (not shown here) is operated by a corresponding number of control levers (also not shown here) the latter being operated by camming means, a portion of the cam shaft 41 only being shown here. Cam shaft 41 is driven by a clutch and transmission means, indicated generally at 50, which is driven by a water powered drive indicated generally at 130 which operates in association with an escapement mechanism indicated generally at 71. The various elements of the water powered drive and relationship to the clutch and transmission means 50 are described in detail in my prior application. However, for present purposes, it should be noted that the water control valve thereof is shown at 238 and that in normal operation of the apparatus of my application Ser. No. 190,528 that a supply of water is periodically discharged from valve 238 through line 159 and, according to the present arrangement, is transmitted via supply line 213 to the control apparatus indicated generally at 200.

The camming means for operating the pilot valves of the controller are driven by a clutch, transmission and drive shaft assembly. The camming means is fixed upon a tubular axle or driven shaft 41 which is driven by drive shaft 51. The outer end of shaft 51 is journaled in a bearing (not shown) provided in wall 22 and an inner portion thereof is journaled within a bearing 53 disposed in an opening in wall 23. Shaft 51 is driven by the transmission means, indicated generally at 50, and forms a part of the means for advancing the camming means between engagements with the respective control levers.

The clutch and transmission means, indicated generally at 50, is driven by motor drive shaft 73, journaled in a suitable bearing (not shown) fixed in an appropriate opening in wall 24, via the pinion gear 75. The transmission means includes a drive shaft 55 having one end journaled in journal bearing 56 fixed within an appropriate opening provided in partition wall 24. A spur gear 57 is mounted on drive shaft 55 and meshes with and is driven by the motor driven pinion gear 75.

Means are provided in the controller for indicating the timed advancement of the transmission drive shaft 55. In the exemplary embodiment, such means includes the provision of a worm gear 58, which may be formed integrally of the drive shaft 55, which mates with a worm (not visible) mounted to a timing disc 60. Disc 60 includes a knob 61 for rotating disc 60 and a cantilevered arm or stud 62 having the worm (not visible) mounted on one end thereof for mating engagement with worm gear 58. Rotation of drive shaft 55 under the influence of the water powered drive of the controller produces a timed rotation of the timing disc 60. The structure of disc 60 and the timing pegs 63 associated therewith are described in detail in my prior application Ser. No. 190,528. As described therein, the location of timing pegs 63 on disc 60 causes a predetermined timed operation of the clutch portion of the transmission means to begin operation of a pilot valve operating cycle.

The clutch and transmission means is provided with a clutch body, indicated generally at 80, which includes an inner driven member 81 having a hollow tubular portion 85 fixed to shaft 51 and an outer driving member 82, as seen in FIG. 2.

The clutch means is further provided with a locking pawl and ratchet wheel assembly for interconnecting the outer driving member 82 to the inner driven member 81 to cause rotation of driven shaft 51 and associated cam shaft 41 by the water powered drive in response to actuation by timing pin 63. A ratchet wheel 86 is preferably formed integrally about a peripheral rim of driving member 82, and is adapted to be engaged by a locking pawl 87 (see FIGS. 5, 7, 8 and 9) pivotally mounted by a pin 88 on a radially extending flange 89 formed integrally of the inner bell-shaped driven member 81. The locking or holding pawl 87 is operated by an associated operating pawl 90 which is also pivotally mounted on flange 89 by a pivot pin 91. Arcuate movement of operating pawl 90 is restricted due to the provision of integral arm 92 adapted to engage stop 93, provided on flange 89, as best seen in FIGS. 7 and 9. The holding pawl 87 is normally biased into a holding or ratchet engaging or locking position as seen in FIG. 9 due to the bias of spring means 94. However, prior to the initiation of a pilot valve operating cycle, a holding lever 95 (FIGS. 5 and 7) is normally positioned in engagement with the arm 96 of operating pawl 90 to hold the locking or holding pawl 87 in an unlocked position. With the pawl assembly in the position of FIGS. 5, 6 and 7, the rotation of transmission drive shaft 55 due to the continuous operation of the timed drive of the water powered drive of my prior application produces a timed rotation of the timing disc 60 but does not cause a rotation of the camming means via driven shaft 51 and clutch inner driven member 81 until the holding pawl 87 is released through displacement of holding lever 95 away from arm 96 of the operating pawl 90.

The pawl assembly operating control arm 100, as best seen in FIGS. 2 and 5, has one end 101 mounted on a stud 102 secured in a boss (not shown) formed integrally of the underside of face plate 20. Arm 100, as best seen in FIG. 5, is normally biased by spring means 104 about the stud 102 into engagement with a stop 105 formed integrally of a housing 106 (FIG. 2) molded to the underside of face plate 20. The housing 106 is open in a quadrant thereof to allow engagement between depending timing pin 63 moving about within the housing 106, with a ramp 109 (FIG. 6) formed integrally of lever 100. As a timing pin 63 is moved by timing disc 60 into engagement with the ramp 109 of lever 100, the lever 100 is pivoted about pin 102 against the bias of spring 104 to move lever 95 out of engagement with operating pawl 90, the lever 100 moving from the position shown in FIG. 5 to the position shown in FIG. 8. Such movement of the control arm or lever 100 may also be effected by manually moving the start button 110 (FIG. 2) protruding out of face plate 20 and which is connected to the free end of 111 of control arm 100 by a vertical pin 112 (see FIGS. 2, 5 and 8).

It can be seen from the foregoing that the cam means of the irrigation control apparatus may be placed in a timed rotational movement under the timed motor drive of the water powered drive via the transmission shaft 55 when the start button 110, or a timing peg 63, moves control arm 100 to disengage the control arm lever 95 from arm 96 of operating pawl 90. On release of pawl 90, the holding or locking pawl 87 moves under its normal spring bias into the holding position of FIG. 9 wherein the inner driven bell-shaped clutch member 81 is engaged in driving relation with the outer bell-shaped clutch member 82. Such drive of the cam means operates the associated water pilot valves to irrigate the associated farming or planting areas, the duration of each watering operation controlled by a pilot valve being determined by the position of adjustment of the associated control lever 36, as more fully explained in my co-pending application aforenoted. The exemplary irrigation control apparatus, indicated generally at 10, is therefore turned on by a timed operation of the clutch and transmission means via pin 63 driven off of the constant drive of the water powered means of the controller. As pointed out hereinbefore, it is desired to correlate the operation of irrigation controllers, such as the present exemplary controller, to the actual need for initiating the irrigation sequence determined by the moisture content of the areas serviced apart from the normal timed operation thereof.

THE PREFERRED EXEMPLARY EMBODIMENT OF WATER OPERATED CONTROL APPARATUS AND METHOD

Referring once again to FIG. 1 of the drawings, the preferred exemplary embodiment of water operated control apparatus in accordance with the present invention, indicated generally at 200, is shown controlling the initiation of operation of the irrigation controller, indicated generally at 10, explained hereinbefore. As seen in FIGS. 2 and 3, the exemplary water operated control apparatus is mounted to a sidewall 22 of the irrigation controller in air communication via line 203 with the moisture sensor 231. Moisture sensor 231 is disposed in the ground 230 beneath the upper surface thereof to sense the moisture content of the area serviced by the controller indicated generally at 10. While shown in the ground adjacent pedestal 12, the moisture sensor 231 could be positioned at a remote location. Preferably, the moisture sensor 231 is made of a material whose porosity varies depending upon the amount of water or moisture in the material. This material may comprise a porous plastic or ceramic material having a bubbling pressure between about one-half and 20 pounds. The pore size of the material making up sensor 231 may be on the order of between 1 and 25 microns, by way of example. Through the use of such materials for the moisture sensor 231, the sensor will not pass air when the surrounding ground is relatively moist. However, when the ground drys out, and the moisture content of the sensor drops, the sensor will pass air therethrough when the soil drys to where the soil moisture tension is equal to the bubbling pressure rating for the sensor. Sensor 231 therefore acts as an air valve for supplying air to line 203, or not, depending upon the presence or absence of a predetermined amount of moisture in the surrounding soil, a given moisture level being selectable through the choice of the specific bubbling pressure for the material chosen. It has been found that a material as described hereinbefore is suitable for operation with the exemplary water operated control herein.

Referring now to FIG. 3, the preferred exemplary embodiment of water operated control apparatus, indicated generally at 200, includes a plastic molded housing 201 having an air inlet 202, connected to air line 203 running from sensor 231, and an internal pressure chamber 204. A cover or cap 205, formed on a one piece molded plastic material, is secured to a boss portion 206 of housing 201, as by a press fit or adhesive connection, and is in turn mounted within an aperture 207 formed in wall 22 by a press or snug fit. Water supply line 213, running from the water valve 238 of the irrigation controller, including line 159, is connected to a water inlet 208 formed integrally of cap 205, the cap 205 and boss 206 forming a water receiving chamber 209. A one piece plastic screen 210 is preferably positioned within chamber 209, screen 210 including a plurality of small diameter apertures 211, to filter water flowing through the chamber 209. Water supply chamber 209 is in fluid communication with pressure chamber 204 via port 212.

An outlet or drain fitting 220 is formed integrally of housing 201 with aperture 221 communicating between chamber 204 and the drain line 222 which may be merely press fit within outlet fitting 220. Drain line 222 is preferably of relatively small diameter, i.e., about one-eight of an inch internal diameter, such that water flow down line 220, whether in continuous or droplet form, will span the internal diameter of the tube, somewhat like a capillary tube, to draw a negative pressure thereabove due to the weight of the water flowing down the drain line. In other words, drain line 222 should be of sufficiently small diameter so that water will not drain down the line 222 if a supply of air is not available in chamber 204.

During the continuous operation of the water power drive for the irrigation controller, indicated generally at 10, the water valve 238 periodically dumps a small amount of water, evacuated from the water drive cylinder indicated generally at 130, through a discharge line 159 into the water supply line 213. Therefore, there is a constant, though periodic, supply of water in relatively small amounts to line 213 which flows therefrom through inlet 208 into chamber 209, through screen 210, orifice 212 into the chamber 204. As the water flows into chamber 204, it falls by gravity through outlet 221 into the small diameter drain line 222. As noted hereinabove, by virtue of the relatively small internal diameter of drain line 222, the water draining therethrough tends to flow in a column, which may be interrupted in drop-like form or continuous, and which, somewhat like a syphon tube, tends to draw a negative pressure thereabove due to the weight of the water column within tube 222. Therefore, the water flow through the water operated control indicated generally at 200 normally tends to pull a less than atmospheric pressure within chamber 204, the actual pressure within chamber 204 depending upon the air supply through line 203 from sensor 231. In the event that the moisture content in the soil surrounding sensor 231 is above a selected level, determined by the bubbling pressure selected for the sensor material used, air will not be passed through sensor 231 into line 203. A negative pressure, less than atmospheric pressure, will therefore be drawn within chamber 204. The creation of this negative pressure within chamber 204, through the use of the hanging column of water through drain line 222 supplied from the irrigation controller, together with the closing of the air supply through line 203 by the sensor 231 when a sufficient moisture condition is experienced in the surrounding soil, is utilized in accordance with the present invention for operating a controlled device as now explained.

Referring again to FIG. 3, it can be seen that housing 201 is provided with a flexible diaphragm 225 spanning one end of housing 204. A peripheral bead 226 of diaphragm 225 is seated in a mating annular groove 227 formed in housing 201 and is held in place via an end cap 228 which may be press fit, or adhesively secured, within an annular boss portion 229 formed integrally of housing 201. Cap 228 is centrally ported, via aperture 233, to provide for the introduction of atmospheric pressure into chamber 234 formed between the interior of cap 228 and diaphragm 225, as well as to provide for passage of a control rod 232 therethrough. Control rod 232 is secured to the diaphragm 225 by any suitable means, mechanical or adhesive. An appropriate resilient socket may be molded into diaphragm 225 to receive the free end of rod 232 in a press fit relation. Also as seen in FIG. 3, cap 228 is provided with a peripheral rim 240 to abut and hold the diaphragm peripheral bead 226 seated within annular groove 227 and is also provided with spacing annular beads 241 to maintain the atmospheric chamber 234 between diaphragm 225 and cap 228.

The diaphragm 225, provided within housing 201 as aforedescribed, thus functions as a controlled device which is controlled in response to the changing pressure conditions within chamber 204. When air flow is stopped through line 203 by virtue of the sensor 231 sensing a moisture level above a predetermined amount, the water flow through drain line 222 will create a hanging column, interrupted or continuous, which will draw a negative pressure in chamber 204 and cause diaphragm 225 to move to the right in FIG. 3. This movement of diaphragm 225 may be employed to operate associated electrical contacts, associated mechanical means, or as in the exemplary embodiment, the control arm 232. The position of diaphragm 225 in FIG. 3 is that which it assumes when a supply of air is flowing through line 203 because of a dry condition surrounding sensor 231. However, when a moist condition is sensed, and the diaphragm 225 and rod 232 are moved to the right in FIG. 3, the control rod 232 assumes the position shown in FIG. 2 where its extreme free end 235 is in interfering engagement with the operating pawl 90 of the clutch and transmission means of the exemplary irrigation control apparatus indicated generally at 10. Rod 232 extends through bearing apertures 236 and 237 provided in controller walls 22 and 23 as seen in FIG. 2. As long as control rod 232 has its free end 235 positioned, as in FIGS. 2 and 5, in interfering engagement with operating pawl 90, the latter will hold the locking pawl 87, as seen in FIG. 7, in a release position even though the start button 10 or timing peg 63, operated under the timed sequence of operation of the controller, would otherwise dictate initiation of an irrigating cycle for the controller. Thus, in accordance with the present invention, the water operated control prevents the initiation of operation of the irrigation controller, although its timing mechanism indicates the same, where a moist condition is experienced in the soil by the moisture sensor associated with the within water operated control.

In the event that the moisture level in the soil surrounding sensor 231 falls below a predetermined level, again determined by the bubbling pressure for the porous material selected, air will be passed through the sensor into line 203 to chamber 204. Such a direction of air into chamber 204 via sensor 231 will cause the pressure therein to rise toward atmospheric pressure and the return of diaphragm 225 to its position illustrated in FIG. 3. The FIG. 3 position for diaphragm 225 and associated rod 232 therefore corresponds to a relatively dry or low-moisture condition for the ground environment of sensor 231. The water operated control apparatus, when in the position of FIG. 3, therefore has sensed a dry soil condition and, through the pneumatically operated means of diaphragm 225, moves control rod 232 to the left in FIG. 2 to cause the free end of rod 235 to be moved away from and free the associated operating pawl 90, as seen in FIGS. 8 and 9. As seen in FIG. 9, the release of operating pawl 90 allows the spring bias of spring 94 to urge locking pawl 87 into engagement with the ratchet wheel 86 formed integrally of outer drive member 82 of the clutch and transmission means. The irrigation controller is thus allowed to operate under its otherwise timed operation to initiate an irrigating sequence of operation for the associated pilot valves through operation of the camming means aforedescribed.

From the foregoing description of a preferred exemplary embodiment of water operated control apparatus, in accordance with the present invention, it can be seen that a method has been disclosed and provided for operating a controlled device, the irrigation controller in the exemplary embodiment, in response to the actual moisture conditions of the soil or ground area serviced by the controller in addition to the timed sequence of operation for the irrigation controller. By way of summary, the method disclosed herein includes the steps of connecting an air valve, moisture sensor 231, in air flow communication, via conduit 203 and inlet 202, with a pressure chamber 204. A vertical column of water, whether continuous or interrupted, is established in a conduit, drain line 222, in fluid flow communication, through port 212, with the chamber 204. Such column of water is produced through the introduction of water into chamber 204 via the supply of water from line 213, through chamber 209, port 212 and into chamber 204.

Chamber 204, according to the present method, is placed in air pressure sensing relation with an air actuated device, diaphragm 225 in the exemplary embodiment. This air actuated device (diaphragm 225), is then operated according to the present method in response to variations in the air pressure in chamber 204 by reducing the air pressure in chamber 204 when air is not passed into the chamber via inlet line 203, due to the tendency of water draining out line 222 to draw a negative pressure thereabove (and thus in chamber 204) and relatively increasing the air pressure in chamber 204 by passing air via line 203 into the chamber when the moisture sensor or air valve 231 passes air therethrough because of the relatively dry condition of the surrounding soil. While the air actuated device (diaphragm 224) in the exemplary is utilized to operate the control rod 232, it could be connected to spring-biased electrical contacts or other mechanical means for operating an associated controlled device, the within irrigation controller indicated generally at 10 being exemplary only.

FIRST ALTERNATIVE EXEMPLARY EMBODIMENT

Referring now to FIGS. 10 and 11, an alternative exemplary embodiment of the water operated control apparatus and method, in accordance with the present invention, will be explained. As seen in FIG. 10, the alternative exemplary embodiment of water operated control is indicated generally at 250 in association with a water line indicated generally at 251. In this alternative exemplary embodiment, the water operated control functions to control the supply of water from the water conduit, indicated generally at 251, to a planted or potted area via drain line 222 in response to the soil conditions sensed by the moisture sensor 231. The water from drain line 222 may be employed, in the alternative exemplary embodiment, for watering a specific tree, shrub, potted plant, planted area or general area to be irrigated. The supply of water provided by the alternative exemplary embodiment is in response to the moisture conditions of the soil surrounding the sensor 231 without regard to a timed watering sequence.

In the embodiment of FIGS. 10 and 11, many of the same elements of the preferred exemplary embodiment of FIGS. 1 through 9 are employed. Like numerals between the alternative exemplary embodiment of FIGS. 10 and 11 and the preferred exemplary embodiment of FIGS. 1 through 9 indicate the same element as before, and a detailed explanation of these identical elements will not be made again.

The water supply conduit, indicated generally at 251 may comprise an upstanding water line 252, connected to a source of water under pressure, and having an elbow fitting 253 connected at an upper end via a threaded nipple 254. The water operated control housing 201 and associated cap 205, may be secured in water flow communication with elbow 253 via an externally threaded nipple 255, as best seen in FIG. 11, which receives the exterior of water inlet fitting 208 therein in a press fit relationship. Water line or post 252 may be connected into a normally available water source, such as that servicing the associated irrigation system or household water supply, and thus provides for a substantial supply of water under pressure to the water operated control indicated generally at 250.

The construction for the alternative exemplary embodiment of water operated control, indicated at 250, as identical to that of the preferred exemplary embodiment with the addition of a nozzle, or restricted orifice, means indicated generally at 260. Such means, in the alternative exemplary embodiment, comprises the provision of a one-piece molded plastic member 261 having a mid-wall 262 with a rearwardly and outwardly extending skirt portion 263 which fits snugly within the interior of boss portion 206 of housing 201. Screen member 210 is positioned rearwardly of the skirt portion 263 as seen in FIG. 11 when used in the alternative exemplary embodiment. The nozzle, or restricted orifice, means further includes the provision of a forward nozzle portion 264 which projects through aperture 212 formed in housing 201 between chambers 204 and 209. An inner passage 265 is formed within nozzle member 264 and is provided with a reducing internal diameter from the inner end to the outer, the outer end of passage 265 forming a restricted, or small diameter, orifice 266 facing diaphragm 225. Member 262 is formed of a resilient plastic material, and by virtue of snug fit between skirt portion 261 and the interior of boss 206, water flow from post 252, via elbow 254, through inlet 208 and chamber 209, will flow through passageway 265 in the nozzle member 264 through the small diameter or restricted orifice 266 into chamber 204. This water supply will then drain, as in the preferred exemplary embodiment, through drain orifice 221 and drain line 222 in a manner to draw a negative pressure within chamber 204, as aforedescribed, when air flow through air line 203 is restricted because of the moisture conditions sensed by moisture sensor 231.

However, the pneumatic or air actuated means, diaphragm 225 in the exemplary embodiment, is not employed to operate a control rod, electrical conduit or mechanical means, as in the preferred exemplary embodiment, but rather is employed for controlling the flow of water through passage 265 by sealing upon orifice 266 when a negative pressure is drawn within chamber 204. Thus, in the alternative exemplary embodiment, the supply of water through drain line 222 to a area to be irrigated is controlled by movement of the diaphragm 225 into and out of sealing engagement with the orifice 266. Diaphragm 225 is preferably formed with a relatively thicker central portion, as illustrated, to seat against orifice 266 with the relatively thinner peripheral areas providing the desired flexibility therefor.

Preferably, orifice 266 should be provided as a relatively small or restricted orifice on the order of about 0.010 inches for its internal diameter. It has been found that a substantial amount of water, under pressure, can be forced through orifice 266 even though of such relatively small diameter. Importantly, drain line 22, while preferably of small diameter also, should have an internal diameter which is larger than that of the internal diameter of orifice 266 so that the water supply into chamber 204 will drain therefrom faster than it is supplied. An internal diameter of approximately one-eight of an inch for drain line 222 will provide for a sufficient drain rate to draw a negative pressure within chamber 204 for the above noted orifice dimension when line 203 is not passing air. It has also been found that a sufficient pressure differential can be obtained in the within device to effect a sealing of orifice 266 by the diaphragm 225, which also may be of relatively small size, such as mall as 0.40 inches in overall diameter. The diaphragm should be made of a resilient material, such as rubber or the like.

When the soil conditions surrounding moisture sensor 213 are such that air cannot be passed through the sensor, then the diaphragm 225 will be moved into sealing engagement with orifice 266 to close off the water supply to the drain line 222. However, when the soil conditions around sensor 231 dry to a level below a predetermined amount which is determinable through selection of the porasity characteristics of the sensor material utilized, air will flow through line 203 into chamber 204 and diaphragm 225 will move away from orifice 266, under the combined influence of the diaphragms natural tendency to assume its normal rest condition as well as the pressure of water present within chamber 209 and passage 265. This water supply will then be drained through line 222 to the desired location until the moisture conditions in the soil surrounding sensor 231 rise above the predetermined level.

SECOND ALTERNATIVE EXEMPLARY EMBODIMENT

Figure 14:
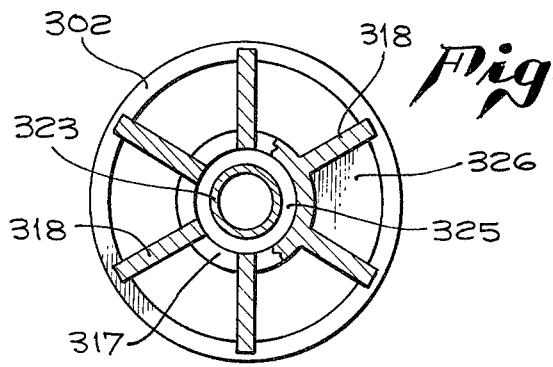
FIG. 14 is a cross section view of the water operated control apparatus of FIG. 12 taken therein along the plane XIII—XIII.
Figure 13:
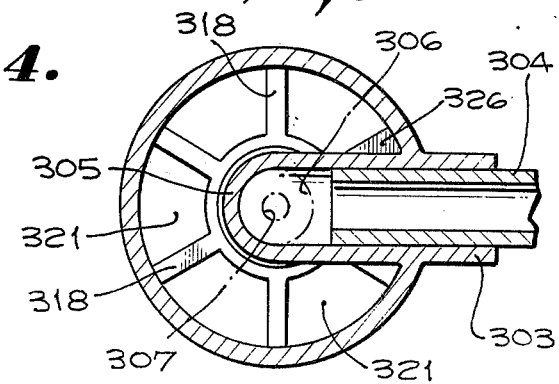
FIG. 13 is a cross section view of the water operated control apparatus of FIG. 12 taken therein along the plane XII—XII.

Referring now to FIGS. 12 through 14, a second alternative exemplary embodiment of water operated control apparatus, in accordance with the present invention, will be disclosed in detail. This further alternative exemplary embodiment of water operated control apparatus, is indicated generally at 300 in FIG. 12 and is connected to a moisture sensitive air valve 231, as previously discussed, via an air conduit 301. In this embodiment, as will be discussed hereinafter, a positive air pressure occurs in the pressure chamber of the apparatus which is released or vented when air passes through line 301 out through sensor or air valve 231.

The control apparatus, indicated generally at 300, as seen in FIG. 12, comprises a housing 302, preferably formed of a suitable moldable plastic material. Housing 302 includes a water inlet 303 connected to a line 304 running to a supply of water under pressure. Inlet 303 extends inwardly of housing 302, as seen in FIG. 12, and is integrally formed with an upstanding boss portion 305.

A nozzle member 306 with a restricted orifice 307 may be provided for restricting water flow from inlet 303 into the interior 308 of the upper head portion 309 of housing 302. Diaphragm 310 is mounted preferably about its peripheral edge in a recessed groove formed in the upper portions of the sidewall of head member 309 generally as discussed in association with the apparatus of FIG. 11. A cap 311 is provided for maintaining the diaphragm in sealed relation to the housing and forms an air pressure chamber 311 above the diaphragm and in communication via conduit 312 and three way fitting 313 to the air conduit line 301 to sensor or air valve 231. As will be discussed hereinafter, the air pressure within pressure chamber 311 is increased above ambient or atmospheric pressure in order to force diaphragm 310 down upon nozzle 306, to close orifice 307, as opposed to the production of a negative pressure beneath the diaphragm as in the previously described exemplary embodiments.

Means are provided for collecting drain water from nozzle or valve orifice 307 in a column thereof and applying its weight against air in the pressure chamber to produce a positive pressure on the diaphragm 310. As seen in FIG. 12, in this embodiment, water flow through line 304, inlet 303 and nozzle 306, by virtue of the relatively small diameter of orifice 307, produces a flow of water down and around the exterior of boss 305 which is directed by an inverted conical section 314 into and collected by a ceramic cup 315. Cup 315 is preferably formed of a porous ceramic material capable of passing approximately 120th of a gallon to 1 gallon of water per hour. The housing 302 and cup 315 are mounted to a support member 316 formed with a tubular hub 317 in which cup 315 is supported and a plurality of radial flanges 318 forming spaces or flutes therebetween, as seen in FIGS. 13 and 14. Support 316 in turn is mounted upon an inner casing 319 of base 320. Excess water flow from nozzle 306 into cup 315, beyond that which its pore size allows to pass therethrough, will flow over the top edge of cup 315, down through the flutes 321 formed between radial flanges 318, as indicated by arrow 322, and onto the surrounding ground area.

Water draining through ceramic cup or receptacle 315, as particularly contemplated within the invention of the present exemplary embodiment, falls by gravity in droplet form into a drain tube 323 mounted directly beneath cup 315 by the casing 319. Importantly, air is entrained with the water droplet flowing down tube 323. As seen in FIG. 12, the upper end of drain tube 323 is exposed to the surrounding ambient air through the air gap 325 provided between the interior of hub 317 and the exterior of tube 323, the latter being exposed to ambient conditions about the apparatus due to the spacing between base central member 319 and housing 302 provided by the fluted support member 316. Passage of air from the surroundings into the space 324, formed within hub 317 below cup 315, through the aforementioned gap 325, is assured through the provision of a cover flange 326 over one of the fluted areas formed between radial flanges 318.

Drain tube 323 is preferably provided with a relatively small internal diameter (on the order of about one-eight inch) in order to assure that the water droplets flowing therethrough will engage the surrounding inner sidewalls of the tube continuously to move entrapped air down the tube. Such entrained and trapped air in tube 323 between the droplets is moved down tube 323 by virtue of the weight of the drops of water, the latter forcing air and water down and out the lower end 327 of drain tube 323. The air escaping from tube end 327 will then flow air bubbles upward around the exterior of drain 323 within the casing 319. An air outlet conduit 328 is formed integrally of casing 319 to communicate the interior thereof with the three way fitting 313, and particularly the two air conduits 301 and 312.

Water flow out the bottom end of drain tube 323 will rise within both the surrounding receptacle 320 and the central casing 319. However, when moisture sensitive air valve 231 does not pass air, because its moisture content is above the predetermined level, air passing up the interior of casing 328 is entrapped within the air lines 301 and 312, the latter communicating with pressure chamber 311 above the diaphragm means 310. With a continued drip of water into drain tube 323, which is taller than base receptacle 320, the water level will rise in the surrounding base receptacle 320 until it vents to the surrounding ground areas through vent 329.

As can be seen from the foregoing, as long as moisture sensitive air valve 231 does not allow the escape of air through conduit 301, air pressure within pressure chamber 311 will build in direct relation to the increase in the water head created by the difference in the height of water column within receptacle 320 (outside of casing 328) and that within casing 328, as hereinbefore explained. The positive pressure within chamber 311 will force diaphragm means 310 down upon nozzle 306 to close off water flow in the apparatus.

On cessation of water flow to the area surrounding the control apparatus, indicated generally at 300, the moisture content of the surrounding soil will eventually drop and the sensor or air valve 231 will commence passing air. On the opening of the air valve 231, due to its sensing a dry condition in its surroundings, the positive pressure hereinbefore described within the pressure system of chamber 311, conduit 312, interior of casing 328 and conduit 301 will be vented and reduced. When a sufficient reduction of pressure has occurred within chamber 311 to allow diaphragm 310 to move back off the nozzle 306, water flow will again commence through the apparatus.

It has been found that in a construction of the present apparatus suitable for flowing approximately 60 gallons of water an hour through the apparatus onto the surrounding ground area, that a nozzle orifice size suitable for orifice 307 is on the order of 0.06 square inches. A comparable area for diaphragm 310 in that event is on the order of 1.5 square inches. With the aforenoted size of orifice and diaphragm means, it has been further found that when the apparatus is constructed to allow for approximately a four inch water head within the base receptacle 320 relative to the water level within casing 328, that a suitable closing pressure for the diaphragm means upon nozzle 306 may be obtained by the within apparatus for closing off a pressure in line 304 of up to about 90 pounds per square inch.

From the foregoing detailed descriptions of a preferred and alternative exemplary embodiments of the water operated control and method, in accordance with the present invention, it can be seen that the present invention achieves the various objects and advantages stated therefor hereinbefore. The watering or irrigating of planted or potted plants, trees, shrubs, or even vast areas can be controlled in response to the actual need for water determined by the sensing of moisture conditions in the associated soil with the operation of associated water valves, irrigation controllers or like equipment being controlled by such need for watering in addition or apart from a timed watering sequence. The within invention accomplishes the aforestated objects and advantages through the use of a water supply generally available to irrigating and watering systems without the need for complicated electrical or mechanical means. Having thus described exemplary embodiments of the present invention, it should be noted by those skilled in the art that the within disclosures are exemplary only and that various other alternatives, adaptations and modifications may be made within the scope of the present invention which is defined and limited only by the following claims.

I claim:
1. A method of operating an air pressure actuated device in response to variations in the amount of air passed through an air valve whose ability to pass air therethrough varies dependent upon the level of moisture available in its environment comprising the steps of:
   connecting said air valve in air flow communication with a chamber;
   establishing a vertical column of water in a conduit in fluid flow communication with said chamber whereby the weight of said column of water has an effect on the air pressure in said chamber;
   placing said chamber in air pressure sensing relation with one side of a diaphragm member of said air actuated device; and
   operating said device in response to variations in the resultant air pressure in said chamber caused by the combined affect thereof of said air valve and column of water.

2. The method of operating an air actuated device as in claim 1 wherein said step of operating said device in response to variations in air pressure in said chamber comprises:
   creating a positive air pressure in said chamber, when air is not passed by said air valve, by the affect of said column of water in communication with said chamber to operate said device and relieving said positive pressure by passing air from said chamber through said air valve when the latter senses a moisture level below a predetermined level.

3. The method of operating an air actuated device as in claim 2 wherein said step of creating a positive air pressure in said chamber includes the steps of:
   entraining air with said column of water and passing said air to said chamber; and
   entrapping said air between said column of water, chamber and said air valve to create said positive pressure in said chamber when the latter is not passing air.

4. The method of claim 1 including the steps of:
   positioning said air valve in the ground in an area thereof where the moisture content is to be sensed for purposes of irrigation;
   positioning said conduit to drain onto said ground in the vicinity of said valve;
   and controlling the flow of water from a source thereof into said conduit by said air pressure actuated device.

5. A method of operating an air pressure actuated device in response to variations in the amount of air passed through an air valve whose ability to pass air therethrough varies dependent upon the level of moisture available in its environment, comprising the steps of:
   connecting said air valve in air flow communication with a chamber;
   establishing a vertical column of water in a conduit in fluid flow communication with said chamber;
   placing said chamber in air pressure sensing relation with said air actuated device; and
   operating said device in response to variations in air pressure in said chamber caused by the combined affect thereon of said air valve and column of water by reducing air pressure in said chamber, when air is not passed by said air valve, by the tendency of said water column to drain out of said conduit and relatively increasing air pressure in said chamber when air is passed by said air valve, as when its moisture content falls belows a predetermined level.

6. The method of operating an air actuated device as in claim 5 wherein said device includes a diaphragm means exposed on one side to atmospheric pressure and said step of reducing air pressure in said chamber comprises drawing a less than atmospheric pressure in said chamber on an opposite side of said diaphragm to move the latter by the force of atmospheric pressure acting thereon.

7. A method of operating an air actuated device in response to variations in the amount of air passed through an air valve whose ability to pass air therehrough varies dependent upon the level of moisture available in its environment comprising the steps of:
   connecting said air valve in air flow communication with a chamber;
   establishing a vertical column of water in a conduit in fluid flow communication with said chamber;
   placing said chamber in air pressure sensing relation with said air actuated device;
   operating said device in response to variations in air pressure in said chamber caused by the combined affect thereon of said air valve and column of water;
   connecting a water drain line to said chamber and establishing said column of water in said drain line; and irrigating a location adjacent said drain line by water flow therethrough.

8. A water operated control apparatus for operating a diaphragm means of an air actuated device in response to variations in the moisture content of an associated moisture sensitive air valve whose ability to pass air varies dependent upon its moisture content level, said apparatus comprising:
- housing means for forming a pressure chamber in fluid pressure responsive relation to said diaphragm means and in air flow communication with said moisture sensitive air valve;
- water inlet means for connecting said housing means to a supply of water under pressure for introducing water into said housing; and
- means for varying air pressure in said pressure chamber subject to air flow through said air valve relative to said chamber, said means comprising a column of water.

9. The water operated control apparatus of claim 8 wherein the air actuated device comprises a diaphragm actuated water valve provided in association with said housing for controlling irrigation of soil at a location generally adjacent said housing in response to the moisture content of soil in which said air valve is located, said water valve comprising said diaphragm and a nozzle means provided in said housing for receiving water from said water inlet means and directing the same into said pressure chamber; said housing having means for mounting said diaphragm means in said housing adjacent said nozzle means for closing the latter against flow of water therethrough upon creation of a differential air pressure across said diaphragm means.

10. The water operated control apparatus of claim 8 wherein said means for varying air pressure in said pressure chamber comprises:
- a water outlet means including a drain tube in fluid communication with said pressure chamber, said tube having an internal diameter such that water draining therethrough tends to hang in a column and pull a partial vacuum in said pressure chamber when air is not being passed therein by said moisture sensitive air valve; and
- said housing is provided with vent means for introducing atmospheric pressure against said diaphragm means on a side thereof opposite to that acted upon by air pressure in said pressure chamber.

11. The water operated control apparatus of claim 8 wherein said air actuated device comprises said diaphragm means and means associated therewith for operating an associated controlled device in response to movement of said diaphragm means and wherein:
- said housing includes means for mounting said diaphragm means therein to form said pressure chamber in said housing on one side of said diaphragm means with an opposite side of said diaphragm means communicating with atmospheric pressure.

12. The water operated control apparatus of claim 11 wherein:
- said water inlet means for connecting said housing means to a supply of water under pressure includes means for introducing said water into said pressure chamber; and
- said mens for varying air pressure in said pressure chamber comprises a drain line in fluid communication with said pressure chamber for draining water supplied thereto in a hanging column of water whereby the weight of said column of water pulls a partial vacuum in said pressure chamber to thereby operate said diaphragm means when air is not being passed therein by said moisture sensitive air valve.

13. The water operated control apparatus of claim 8 wherein said moisture sensitive air valve comprises:
- a ceramic material and is disposed at the end of an air conduit coupled to said housing, said ceramic material having a bubbling pressure of between about one half to twenty pounds and a pore size of between about one half to twenty-five microns.

14. The water operated control apparatus of claim 8 wherein said means for varying air pressure in said pressure chamber comprises:
- means for collecting drain water in a column thereof and applying the force of said column against air in said pressure chamber to produce a partial pressure on said diaphragm means.

15. The water operated control apparatus of claim 14 wherein said collecting means includes a porous ceramic cup and a drain tube positioned therebelow to catch water droplets from said cup and entrain said droplets and air therebetween in a vertical column thereof.

16. The water operated control apparatus of claim 15 wherein:
- casing means is provided about said drain tube to receive water and air therefrom, said casing extending upwardly about said tube to an air connection to said pressure chamber and to said air valve.

17. The water operated control apparatus of claim 11 wherein said means for varying air pressure in said pressure chamber comprises:
- means for draining at least a portion of water from said housing in droplets;
- drain tube means positioned to receive said droplets and entrain air therewith;
- casing means associated with said drain tube and communicating with said pressure chamber, for directing air entrained in said drain tube through said casing means toward said pressure chamber; and
- reservoir means for receiving water, from said drain tube and holding it in a head of water relative to said casing means to pressure air trapped in said casing means and pressure chamber when said air valve is not passing air.

* * * * *